United States Patent
Kim et al.

(10) Patent No.: US 10,084,258 B2
(45) Date of Patent: Sep. 25, 2018

(54) POWER CONNECTOR FOR THERMOSTAT AND MANUFACTURING METHOD THEREOF

(71) Applicants: INZICONTROLS CO., LTD., Gyeonggi-do (KR); Delphi Connection Systems Korea LLC, Gyeonggi-do (KR)

(72) Inventors: Yong-Jeong Kim, Gyeonggi-do (KR); Hee-Hwa Joung, Gyeonggi-do (KR); Seung-Chan Ha, Gyeonggi-do (KR); Jae-Yup Jung, Gyeonggi-do (KR); Joo-Hyun Park, Gyeonggi-do (KR); Min-Young Lee, Gyeonggi-do (KR); Hyun-Chul Baek, Gyeonggi-do (KR)

(73) Assignees: INZICONTROLS CO., LTD, Siheung-Si, Gyeonggi-do (KR); Delphi Connection Systems Korea LLC, Hwaseong-Si, Gyeonggi-do (KR)

( * ) Notice: Subject to any disclaimer, the term of this patent is extended or adjusted under 35 U.S.C. 154(b) by 50 days.

(21) Appl. No.: 15/327,598

(22) PCT Filed: Jul. 22, 2015

(86) PCT No.: PCT/KR2015/007628
§ 371 (c)(1),
(2) Date: Jan. 19, 2017

(87) PCT Pub. No.: WO2016/013872
PCT Pub. Date: Jan. 28, 2016

(65) Prior Publication Data
US 2018/0219318 A1    Aug. 2, 2018

(30) Foreign Application Priority Data
Jul. 23, 2014  (KR) .................. 10-2014-0092964

(51) Int. Cl.
*H01R 13/506* (2006.01)
*H01R 24/28* (2011.01)
(Continued)

(52) U.S. Cl.
CPC .......... *H01R 13/506* (2013.01); *B60R 16/03* (2013.01); *H01R 13/424* (2013.01);
(Continued)

(58) Field of Classification Search
CPC .... H01R 13/506; H01R 24/28; H01R 13/516; H01R 2103/00; H01R 24/20
(Continued)

(56) References Cited

U.S. PATENT DOCUMENTS 2,443,797 A * 6/1948 Miller ................ H01R 13/055
439/651
5,252,081 A * 10/1993 Hart ...................... H01R 9/032
439/106
(Continued)

FOREIGN PATENT DOCUMENTS

CN  201236763 Y  5/2009
CN  103362625 A  10/2013
(Continued)

OTHER PUBLICATIONS

International Search Report and Written Opinion dated Oct. 6, 2015 for PCT Application No. PCT/KR2015/007628.
(Continued)

*Primary Examiner* — Gary Paumen
(74) *Attorney, Agent, or Firm* — Plumsea Law Group, LLC

(57) ABSTRACT

Disclosed are a power connector of a thermostat and a manufacturing method thereof. A power connector for a thermostat an exemplary embodiment of the present invention connected with a lead wire included in a cartridge heater
(Continued)

to supply power to the cartridge heater, the power connector for a thermostat including: a main body including an end connected with an external power terminal; two bus bar terminals including opposite ends partially protruding from an opposite end of the main body while ends of the bus bar terminals are inserted into the main body; a lower cover including one end connected with the main body at a lower portion of the main body, and formed therein with an insertion hole in which a lead wire of the cartridge heater is inserted; a ring terminal mounted inside the lower cover corresponding to the insertion hole to be connected with each bus bar terminal, wherein the lead wire inserted into the insertion hole is inserted and fixed into the ring terminal; and an upper cover coupled with the lower cover at a lower portion of the lower cover, wherein one end of the upper cover is connected with one end of the main body.

32 Claims, 9 Drawing Sheets

(51) Int. Cl.
  *B60R 16/03* (2006.01)
  *H01R 13/424* (2006.01)
  *H01R 43/20* (2006.01)
  *H01R 13/52* (2006.01)

(52) U.S. Cl.
  CPC ......... *H01R 13/5202* (2013.01); *H01R 43/20* (2013.01); *H01R 2201/26* (2013.01)

(58) Field of Classification Search
  USPC ................................ 439/686, 687, 695–697
  See application file for complete search history.

(56) References Cited

U.S. PATENT DOCUMENTS

| | | | |
|---|---|---|---|
| 6,599,151 B2* | 7/2003 | Chiran | H01R 13/506 439/607.48 |
| 7,044,762 B1* | 5/2006 | Hong | H01R 13/5213 439/275 |
| 8,944,857 B2* | 2/2015 | Mariano | H01R 13/504 439/695 |
| 2002/0137397 A1* | 9/2002 | Little | H01R 13/501 439/686 |
| 2013/0164996 A1* | 6/2013 | Miyakawa | H01R 13/111 439/694 |
| 2014/0073153 A1* | 3/2014 | Pai | H01R 13/71 439/131 |
| 2016/0134071 A1* | 5/2016 | Toh | H01R 35/04 439/13 |

FOREIGN PATENT DOCUMENTS

| | | |
|---|---|---|
| JP | 10-199606 A | 7/1998 |
| JP | 4405047 B2 | 1/2010 |
| KR | 20-04500922 Y1 | 9/2010 |
| KR | 10-1142646 B1 | 5/2012 |

OTHER PUBLICATIONS

Office Action dated Jun. 11, 2018 for Chinese Patent Application No. 201580040916.2.

* cited by examiner

US 10,084,258 B2

POWER CONNECTOR FOR THERMOSTAT AND MANUFACTURING METHOD THEREOF

CROSS-REFERENCE TO RELATED APPLICATION(S)

This application is the U.S. National Phase application of PCT application number PCT/KR2015/007628 having a PCT filing date of Jul. 22, 2015, which claims priority of Korean patent application 10-2014-0092964 filed on Jun. 23, 2014, the disclosures of which are hereby incorporated by reference.

BACKGROUND OF THE INVENTION

Technical Field

The present invention relates to a power connector of a thermostat and a manufacturing method thereof. More particularly, the present invention relates to a power connector of a thermostat connected with a cartridge heater in an electronic thermostat to stably supply external power to the cartridge heater, and a manufacturing method thereof.

Background Art

In general, a thermostat for a vehicle is installed between an engine and a radiator, is automatically open and closed according to temperature change of cooling water, and controls a flow rate of the cooling water introduced into the radiator to maintain the cooling water at an appropriate temperature.

The thermostat may control a temperature of an engine by controlling a flow rate of the cooling water according to an opening/closing displacement of a valve.

Meanwhile, for example, a thermostat for a current vehicle includes a mechanical thermostat having a structure where expansion force of wax expanded according to a temperature of cooling water is transferred to a piston so that an opening/closing displacement of a valve is generated.

That is, a mechanical thermostat according to the related art includes a frame installed in a cooling water fluid path, a valve configured to open/close the cooling water fluid path, a spring configured to support the valve, and a capsule including wax and a piston. When a temperature of the cooling water is increased to a regulation temperature (about 80 to 90° C.), the wax is changed from a solid state to a liquid state. In this case, force generated due to volume change is transferred to the piston to move the valve.

Since the mechanical thermostat is operated according to an opening/closing temperature set as a regulation temperature of the cooling water, that is, it simply opens/closes a valve only at a regulation temperature. Accordingly, in view of a recent trend of high integration and high performance, there are limitations on actively dealing with changes in running circumstances of the vehicle and other conditions.

Accordingly, in recent years, an electronic thermostat in a variable control scheme for maintaining a temperature of cooling water in an engine at an optimal state has been proposed in view of drawbacks of the mechanical thermostat.

The electronic thermostat may always maintain an optimal cooling state of an engine by controlling a temperature of cooling water in the engine according to running circumstances such as a load state of the vehicle, and may present a fuel efficiency improvement effect and an exhaust gas reduction effect as compared with the mechanical thermostat.

In this case, a general electronic thermostat has a structure further including a plug configured to supply power and a heater configured to cause wax to react. When power is supplied to the general electronic thermostat, the general electronic thermostat variably controls an opening/closing time of a valve by controlling an amount of heat of the heater according to the driving circumstances of the vehicle such as speed of the vehicle, a temperature of intake air, and a load of the engine, using a separate heat source.

However, the electronic thermostat according to the related art as described above uses a film resistor type of heater, such that it takes 50 to 70 seconds to reach a target temperature of 300 to 350° C.

That is, since it takes a considerable amount of time to increase a heating temperature of a heater to a target temperature, the temperature of the cooling water cannot be controlled in real time, and it is difficult to maximize the fuel efficiency improvement effect of the vehicle.

In order to prevent the above problem, in recent years, a cartridge heater has been applied instead of a film resistor type of heater for improving responsiveness of a thermostat. The cartridge heater is connected with a power connector inside the thermostat.

However, in the thermostat according to the related art including the cartridge heater as described above, it is not easy to connect the cartridge heater with the power connector, and a lead wire may not be stably fixed to the power connector so that the connection may be released due to impact energy such as vibration when a vehicle runs.

Further, in order to supply power to the cartridge heater, the number of constituent elements mounted inside the power connector is increased so that assembling and manufacturing are difficult.

DISCLOSURE

Technical Problem

The present invention has been made in an effort to provide a power connector for a thermostat and a manufacturing method thereof having advantages of being connected with a cartridge heater in an electronic thermostat and integrally provided therein with a bus bar terminal to easily supply power, of being easily manufactured by applying an assembling type of structure, and of improving responsiveness of a cartridge heater by stably supplying power because connection reliability with the cartridge heater may be ensured.

Technical Solution

An exemplary embodiment of the present invention provides a power connector for a thermostat connected with a lead wire included in a cartridge heater to supply power to the cartridge heater, the power connector for a thermostat including: a main body including an end connected with an external power terminal; two bus bar terminals including opposite ends partially protruding from an opposite end of the main body while ends of the bus bar terminals are inserted into the main body; a lower cover including one end connected with the main body at a lower portion of the main body, and formed therein with an insertion hole in which a lead wire of the cartridge heater is inserted; a ring terminal mounted inside the lower cover corresponding to the insertion hole to be connected with each bus bar terminal, wherein the lead wire inserted into the insertion hole is inserted and fixed into the ring terminal; and an upper cover coupled with the lower cover at a lower portion of the lower cover, wherein one end of the upper cover is connected with one end of the main body.

The bus bar terminals may be integrally provided inside the main body through insert injection molding when the main body is molded.

At least one locking hook may be formed at one side of the upper cover corresponding to the lower cover.

The locking hooks may be formed at both sides of one end and a rear end of the upper cover, respectively.

At least one locking groove may be formed at an outer peripheral surface of the lower cover corresponding to the locking hook.

The locking grooves may be formed at both outer peripheral sides of one end and a rear end of the lower cover, respectively.

The lower cover and the upper cover may include a section having a semicircular shape to be coupled with each other, which leads to formation of a cylindrical shape.

The ring terminal may be mounted through a mounting hole connected with the insertion hole inside the lower cover, and may be fixed through laser welding while being mounted in the mounting hole.

The insertion hole may be formed perpendicular to the main body at the opposite end of the lower cover.

The bus bar terminals may be connected as a positive (+) pole and a negative (−) pole, respectively, when power is connected.

An opposite end of the main body may be mounted therein with a sealing member between the lower cover and the upper cover where one end of the lower cover is assembled with one end of the upper cover.

The sealing member may have a ring shape, and may be made of a silicon material.

Another embodiment of the present invention provides a power connector for a thermostat connected with a lead wire included in a cartridge heater to supply power to the cartridge heater, the power connector for a thermostat including: a main body including an end connected with an external power terminal; two bus bar terminals including opposite ends partially protruding from an opposite end of the main body while ends of the bus bar terminals are inserted into the main body; a lower cover including one end connected with the main body at a lower portion of the main body; a ring terminal mounted at an inner side of an opposite end of the lower cover to be connected with each of the bus bar terminals; an upper cover including one end connected with an opposite end of the main body at a lower portion of the lower cover to be coupled with the lower cover; and a coupling hole connected at opposite ends of the lower cover and the upper cover which are coupled with each other by inserting a lead wire of the cartridge heater into the ring terminal.

The coupling hole may be formed horizontally with respect to the main body.

The bus bar terminals may be integrally provided inside the main body through insert injection molding when the main body is molded.

At least one locking hook may be formed at one side of the upper cover corresponding to the lower cover.

The locking hooks may be formed at both sides of one end and a rear end of the upper cover, respectively.

At least one locking groove may be formed at an outer peripheral surface of the lower cover corresponding to the locking hook.

The locking grooves may be formed at both outer peripheral sides of one end and a rear end of the lower cover, respectively.

The lower cover and the upper cover may include a section having a semicircular shape to be coupled with each other, which leads to formation of a cylindrical shape.

An opposite side of the ring terminal may be fixed through laser welding in a state in which one side of the ring terminal is connected with the bus bar terminal inside the lower cover.

The bus bar terminals may be connected as a positive (+) pole and a negative (−) pole, respectively, when power is connected.

An opposite end of the main body may be mounted therein with a sealing member between the lower cover and the upper cover where one end of the lower cover is assembled with one end of the upper cover.

The sealing member may have a ring shape, and may be made of a silicon material.

An opposite side of the ring terminal may be fixed through laser welding in a state in which one side of the ring terminal is connected with the bus bar terminal inside the lower cover.

The sealing member may have a ring shape, and may be made of a rubber material.

Yet another embodiment of the present invention provides method of manufacturing a power connector for a thermostat connected with a lead wire included in a cartridge heater to supply power to the cartridge heater, the method including: injection molding a main body and lower and upper covers; assembling the lower cover in the main body; mounting a ring terminal in the lower cover; assembling the upper cover with an upper portion of the lower cover on which the ring terminal is mounted; and mounting a sealing member between the main body and the lower cover and the upper cover which are coupled with each other.

The main body may be molded through injection molding in a state in which the main body is provided therein with two bus bar terminals.

The bus bar terminal may partially protrude toward the lower cover and the upper cover mounted in the main body.

One side of the ring terminal may be connected with each bus bar terminal protruding from the main body inside the lower cover, and an opposite side of the ring terminal may be fixed inside the lower cover through laser welding.

The upper cover may be integrally formed therein with at least one locking hook corresponding to at least one locking groove to be coupled and fixed in the locking groove which is formed in the lower cover.

The sealing member may have a ring shape, and may be made of a silicon material.

One side of the ring terminal may be connected with each bus bar terminal protruding from the main body inside the lower cover, an opposite end of the ring terminal may be fixed inside the lower cover through welding, and the sealing member may have a ring shape and may be made of a rubber material.

Advantageous Effects

As described above, in the power connector for a thermostat according to an exemplary embodiment of the present invention, a bus bar terminal is integrally provided inside the power connector, assembling and manufacturing are easy by applying an assembling type of structure, and productivity may be improved by reducing a manufacturing time.

Further, when the power connector for a thermostat is connected with the cartridge heater, a lead wire is prevented from being separated while inserting the lead wire so that the connection reliability with the lead wire may be ensured to stably supply power to the cartridge heater. Accordingly, responsiveness of the cartridge heater may be improved, and the overall merchantability of the thermostat may be improved.

In addition, the power connector for a thermostat may be vertically or horizontally connected with the cartridge heater to easily connect external power according to a mounting position or a housing shape of the thermostat so that mountability and connectivity can be improved.

MODE FOR INVENTION

Figure 1:
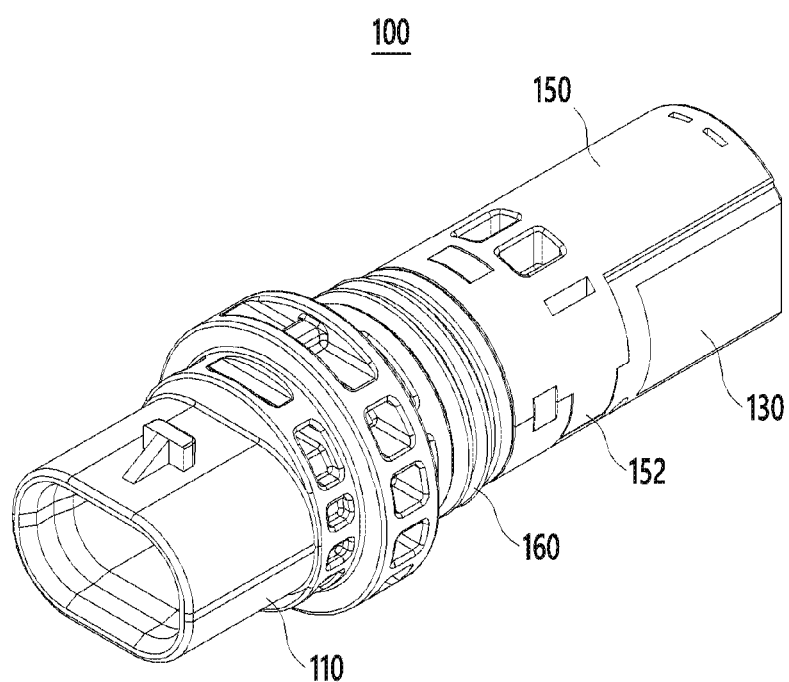
FIG. 1 is a perspective view illustrating a power connector for a thermostat according to an exemplary embodiment of the present invention.

Hereinafter, an exemplary embodiment of the present invention will be described in detail with reference to the accompanying drawings.

Although embodiments are described with reference to a number of illustrative embodiments thereof, it should be understood that numerous other modifications and embodiments that can be devised by those skilled in the art will fall within the spirit and scope of the principles of this disclosure.

Accordingly, the drawings and description are to be regarded as illustrative in nature and not restrictive. Like reference numerals designate like elements throughout the specification.

Further, the size and thickness of each configuration shown in the drawings are optionally illustrated for better understanding and ease of description, but the present invention is not limited to shown drawings, and the thickness and size of each layer and each region may be exaggerated for the purpose of clarity.

In addition, unless explicitly described to the contrary, the word "comprise" and variations such as "comprises" or "comprising" will be understood to imply the inclusion of stated elements but not the exclusion of any other elements.

Further, the terms " . . . unit", " . . . means", " . . . part", " . . . member" and the like used in the specification mean a unit of a comprehensive configuration to perform at least one function or operation.

Figure 2:
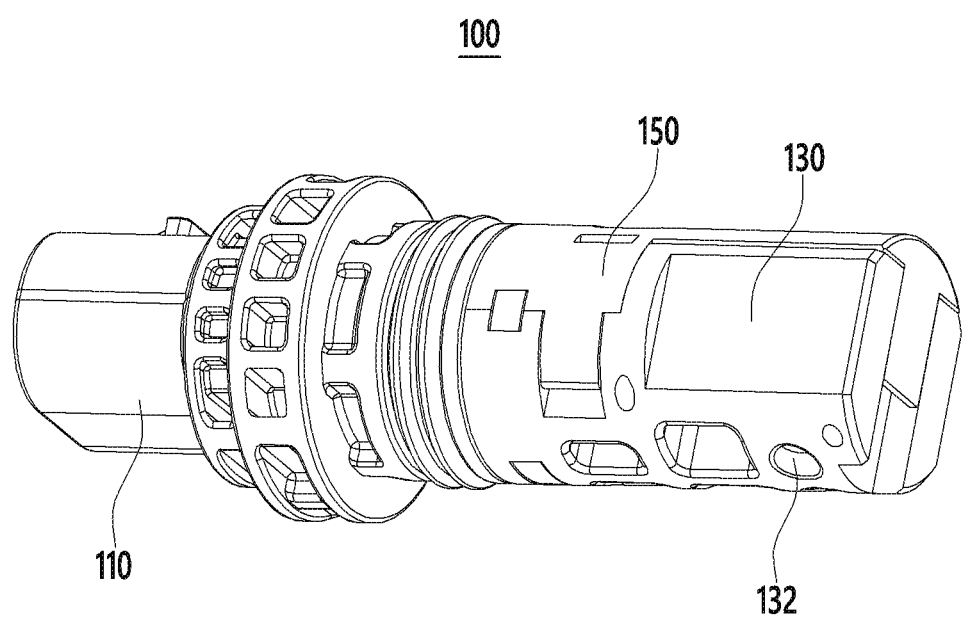
FIG. 2 is a rear perspective view illustrating a power connector for a thermostat according to an exemplary embodiment of the present invention.
Figure 3:
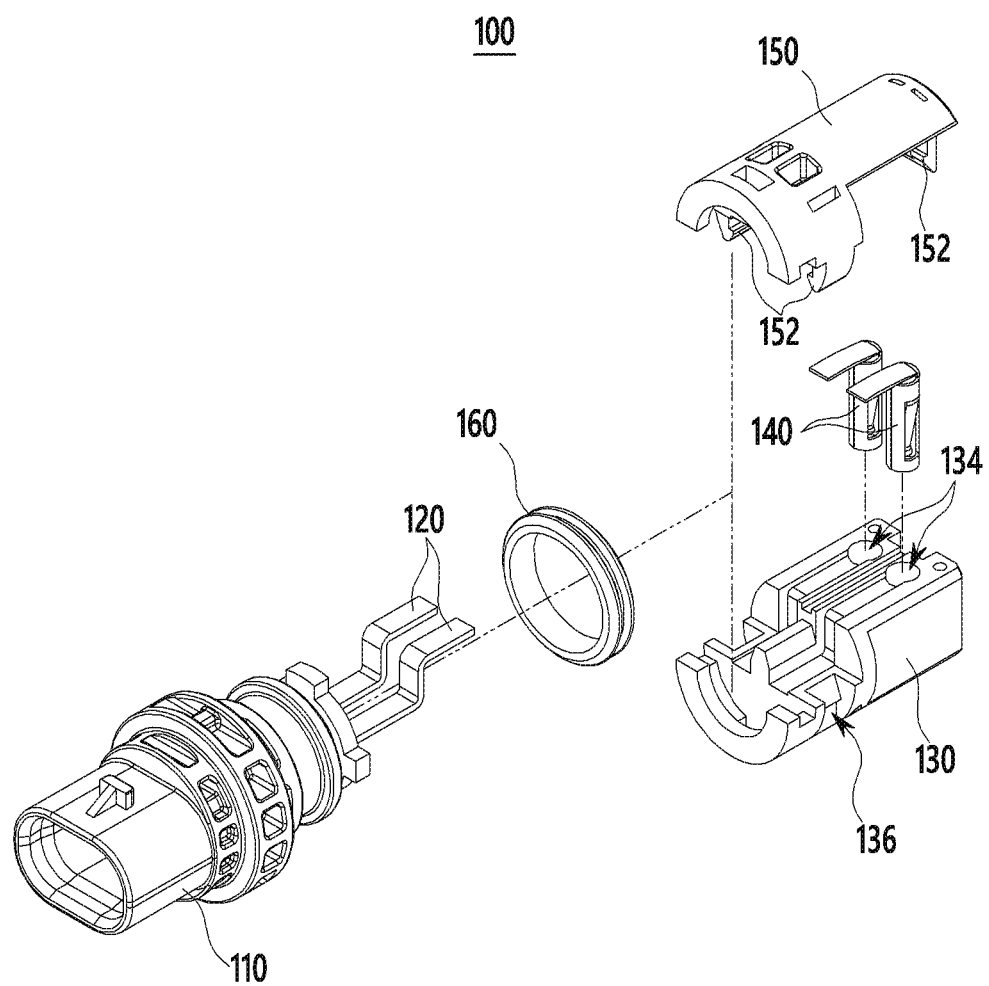
FIG. 3 is an exploded perspective view illustrating a power connector for a thermostat according to an exemplary embodiment of the present invention.
Figure 4:
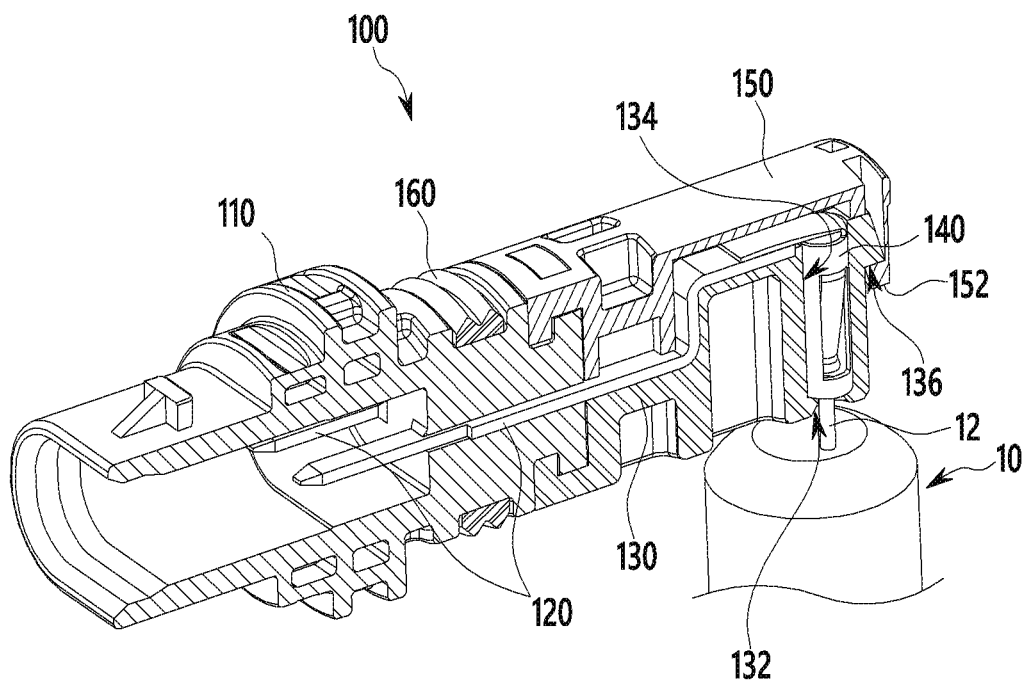
FIG. 4 is a cross-sectional perspective view illustrating a power connector for a thermostat according to an exemplary embodiment of the present invention.
Figure 5:
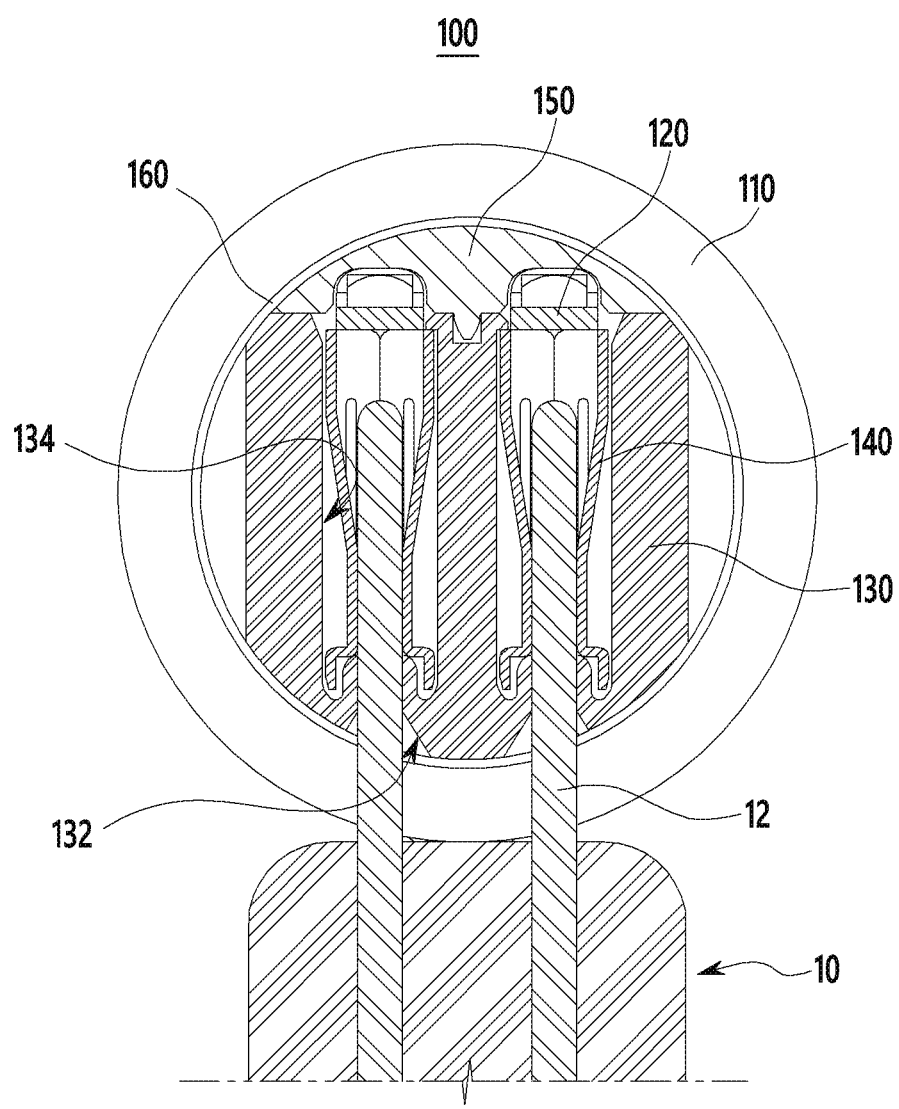
FIG. 5 is a cross-sectional view illustrating a state where a power connector for a thermostat is connected with a lead wire of a cartridge heater according to an exemplary embodiment of the present invention.

FIG. 1 and FIG. 2 are a perspective view and a rear perspective view illustrating a power connector for a thermostat according to an exemplary embodiment of the present invention, FIG. 3 is an exploded perspective view illustrating a power connector for a thermostat according to an exemplary embodiment of the present invention, FIG. 4 is a cross-sectional perspective view illustrating a power connector for a thermostat according to an exemplary embodiment of the present invention, and FIG. 5 is a cross-sectional view illustrating a state where a power connector for a thermostat is connected with a lead wire of a cartridge heater according to an exemplary embodiment of the present invention.

Referring to the drawings, a power connector 100 for a thermostat according to an exemplary embodiment of the present invention is connected with a cartridge heater 10 in an electronic thermostat and is integrally provided therein with a bus bar terminal 120 to easily supply power, manufacturing is easy by applying an assembling type of structure, and power is stably supplied so that responsiveness of the cartridge heater 10 can be improved because connection reliability with the cartridge heater 10 may be ensured.

To this end, in the power connector 100 for a thermostat according to an exemplary embodiment of the present invention, as shown in FIG. 1 to FIG. 4, a lead wire 12 provided in the cartridge heater 10 is connected with the power connector 100 so that the power connector 100 supplies power to the cartridge heater 10. The power connector 100 for a thermostat includes a main body 110, the bus bar terminal 120, a lower cover 130, a ring terminal 140, and an upper cover 150.

First, an external power terminal is connected with an end of the main body 110.

Two bus bar terminals 120 are provided. Opposite ends of the bus bar terminals 120 partially protrude from another end of the main body in a state in which ends of the bus bar terminals 120 are inserted into an end of the main body 110 in which an external power terminal (not shown) is inserted.

When the main body 110 is formed by injection molding, the bus bar terminal 120 may be integrally provided inside the main body 110 through insert injection molding. When power is connected, the bus bar terminals 120 may be connected as a positive (+) pole and a negative (−) pole, respectively.

In this case, the insert injection molding mold-supplies the bus bar terminal to be mounted in a molded article by performing injection molding while providing a bolt or a nut, or a component such as the bus bar terminal or a copper line in a mold, which is well known in the art. Hereinafter, a detailed description of a configuration and a manufacturing method thereof will be omitted.

In the present exemplary embodiment, one end of the lower cover 130 is connected with the main body 110 at a lower portion of the main body 110, and two insertion holes 132 are spaced apart from each other in an opposite end of the lower cover 130. Lead wires 12 of the cartridge heater 10 are inserted into the two insertion holes 132, respectively.

In this case, the insertion hole 132 may be formed perpendicular to the main body 110 at an opposite end of the lower cover 130.

That is, a mounting direction of the power connector 100 mounted inside a thermostat housing is changed according to a mounted position of the thermostat inside an engine compartment. When the power connector 100 is transversely mounted inside the thermostat housing, the insertion hole 132 is formed at a lower portion of the lower cover 130 perpendicular to the main body 110, so that the power connector 100 is easily connected with the lead wire 12 of the cartridge heater 10 which is longitudinally mounted inside the thermostat.

In the present exemplary embodiment, the ring terminal 140 is mounted inside the lower cover 130 corresponding to the insertion hole 132 to be connected with each bus bar terminal 120, and the lead wire 12 inserted into the insertion hole 132 is inserted and fixed into the ring terminal 140.

The ring terminal 140 may be formed of a conductive metal material, and may be mounted through a mounting hole 134 connected with an insertion hole 132 inside the lower cover 130.

In this case, the ring terminal 140 may be fixed in the mounting hole 134 through laser welding while being mounted in the mounting hole 134.

In the present exemplary embodiment, the ring terminal 140 is fixed through laser welding by way of example, but the present invention is not limited thereto. That is, various welding methods including laser welding are applicable.

The ring terminal 140, as shown in FIG. 5, has a cylindrical shape so that the lead wire 12 may be inserted into the ring terminal 140. A width of the ring terminal 140 is gradually reduced in the direction of a bottom end of the ring terminal 140 from one end thereof so that the ring terminal 140 firmly fixes the lead wire 12 to prevent the inserted lead wire 12 from being separated from the ring terminal 140, and stably connects the bus bar terminal 120 with the lead wire 12.

Further, the upper cover 150 is coupled with the lower cover 130 at a lower portion of the lower cover 130, and one end of the upper cover 150 is connected with one end of the main body 110.

At least one locking hook 152 may be formed at one side of the upper cover 150 corresponding to the lower cover 130. The locking hooks 152 may be formed at both sides of one end and a rear end of the upper cover 150, respectively.

In this case, at least one locking groove 136 may be formed at an outer peripheral surface of the lower cover 130 corresponding to each locking hook 152. In the present exemplary embodiment, the locking grooves 136 may be formed at both outer peripheral sides of one end and a rear end of the lower cover 130 corresponding to a position of the locking hook 152, respectively.

Accordingly, the locking grooves 136 are formed at both outer peripheral sides of one end and a rear end of the lower cover 130 suitably for positions of the locking hooks 152 which protrude downward of both sides of one end and a rear end of the upper cover 150, so that each locking hook 152 is locked and fixed in each locking groove 136 in an assembled state when the upper cover 150 is assembled at an upper portion of the lower cover 130.

The lower cover 130 and the upper cover 150 include a section having a semicircular shape to be coupled with each other, which leads to formation of a cylindrical shape.

That is, the lower cover 130 and the upper cover 150 configured as above are manufactured through injection molding and assembled with each other so that the bus bar terminal 120 may be conveniently mounted in the insert injection molded main body 110, and the ring terminal 140 connected with each bus bar terminal 120 may be easily mounted.

Meanwhile, in the present exemplary embodiment, an opposite end of the main body 110 may be mounted therein with a sealing member 160 between the lower cover 130 and the upper cover 150 where one end of the lower cover 130 is assembled with one end of the upper cover 150.

The sealing member 160 has a ring shape, and may be made of a silicon material.

Accordingly, the sealing member 160 is inserted toward the main body 110 from rear ends of the lower cover 130 and the upper cover 150 coupled with each other in a state in which the lower cover 130 and the upper cover 150 are assembled and mounted in the main body 110. In this case, the sealing member 160 is inserted to increase an inside diameter of the sealing member 160 so that the lower cover 130 and the upper cover 150 may be easily mounted.

If the sealing member 160 is mounted in a correct position in the main body 110, the inside diameter is reduced in an initial state by elastic restoring force so that the sealing member 160 is firmly fixed in the main body 110.

The sealing member 160 is mounted in the main body 110 between the main body 110 and the lower and upper covers 130 and 150 to prevent cooling water introduced into a thermostat housing (not shown) through the power connector 100 mounted inside the thermostat housing from leaking so that a space between an outer peripheral surface of the connector 100 and the thermostat housing is sealed to prevent the cool water from leaking.

In the present exemplary embodiment, the sealing member 160 is formed of a silicon material by way of example, but the present invention is not limited thereto. That is, the sealing member 160 may be formed of a rubber material.

Hereinafter, a method of manufacturing a power connector for a thermostat according to an exemplary embodiment of the present invention will be described with reference to FIG. 6 and FIG. 7.

Figure 6:
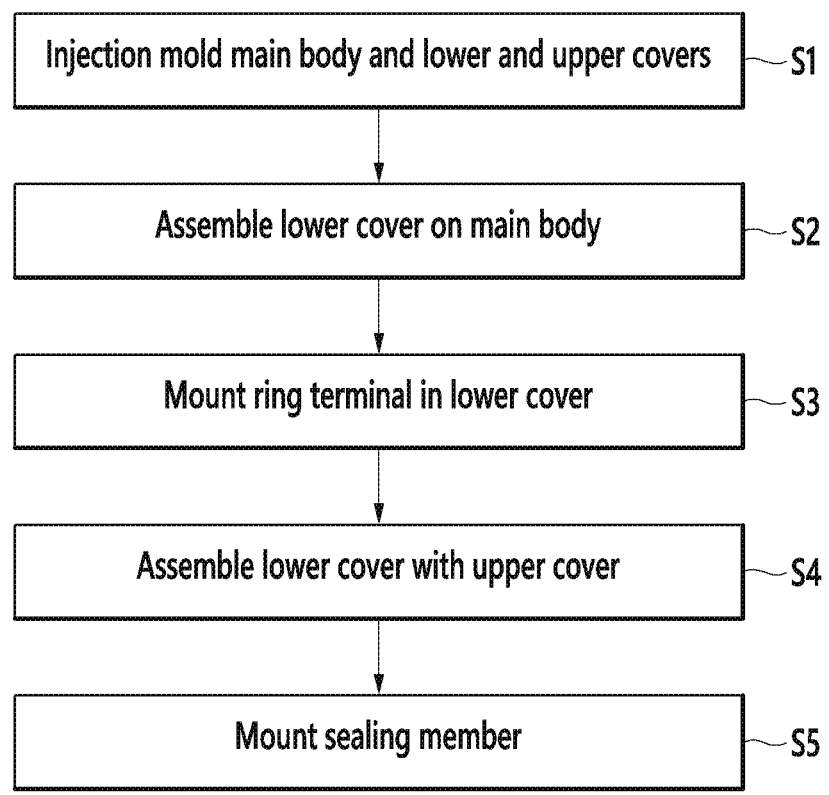
FIG. 6 is a flowchart illustrating a method of manufacturing a power connector for a thermostat according to an exemplary embodiment of the present invention.
Figure 7:
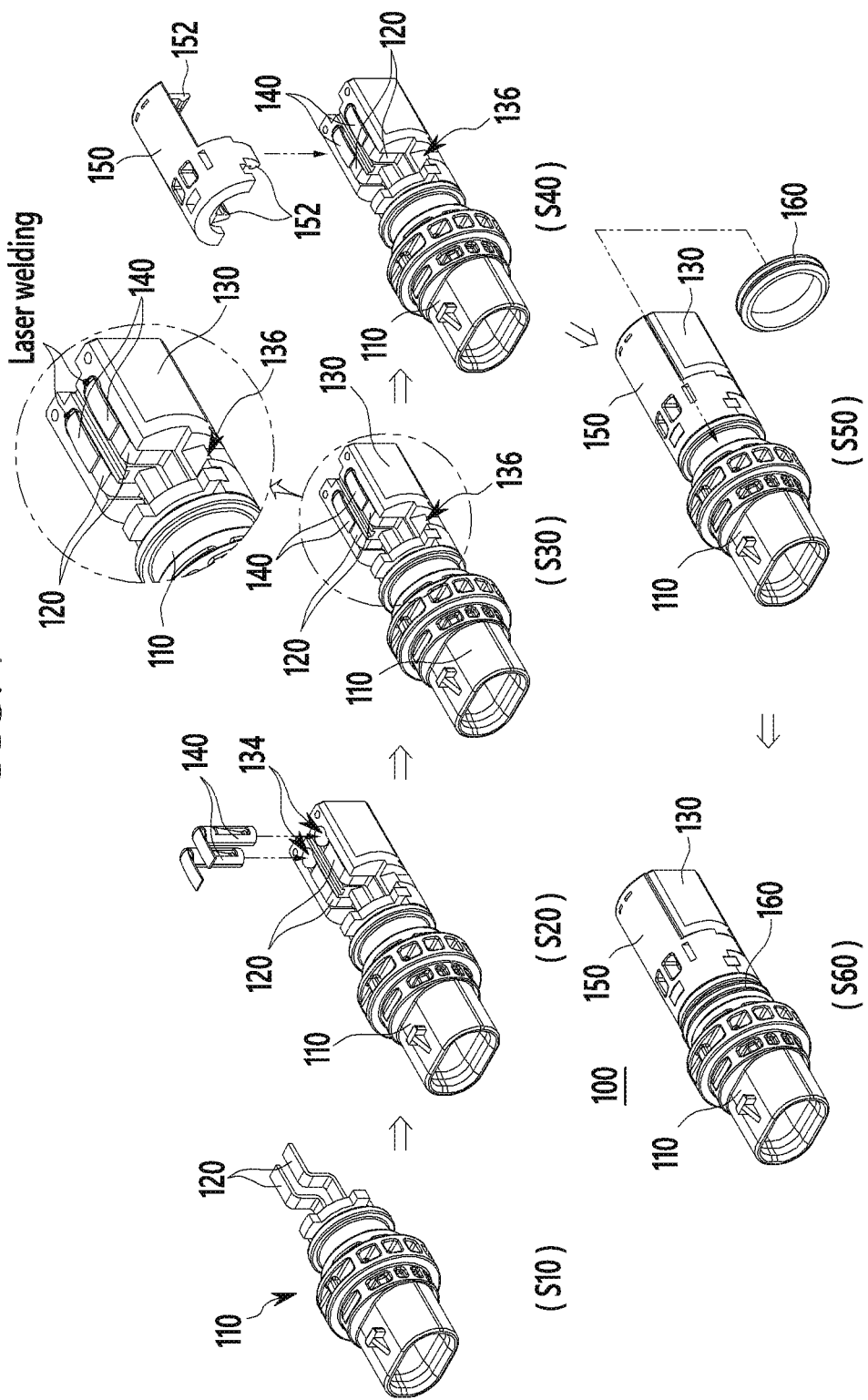
FIG. 7 is a view illustrating steps of a method of manufacturing a power connector for a thermostat according to an exemplary embodiment of the present invention.

FIG. 6 is a flowchart illustrating a method of manufacturing a power connector for a thermostat according to an exemplary embodiment of the present invention, and FIG. 7 is a view illustrating steps of a method of manufacturing a power connector for a thermostat according to an exemplary embodiment of the present invention.

Referring to FIG. 6, in the method of manufacturing a power connector for a thermostat according to an exemplary embodiment of the present invention, a main body 110 and lower and upper covers 130 and 150 are injection molded (S1 of FIG. 6).

In this case, the main body 110, as shown in S10 of FIG. 7, may be molded through injection molding in a state in which the main body 110 is provided therein with two bus bar terminals 120 to be spaced apart from each other.

Further, the bus bar terminal 120 may partially protrude toward the lower cover 130 and the upper cover 150 to be mounted on the main body 110 from an opposite end of the main body 110.

If the injection molding is terminated, a worker assembles one end of the lower cover 13 in an opposite bottom end of the main body 110 from which each bus bar terminal 120 protrudes (S2 of FIG. 6), and mounts a ring terminal 140 in a mounting hole 134 of the assembled lower cover 130 (S3 of FIG. 6).

In this case, the ring terminals 140, as illustrated in S20 to S30 of FIG. 7, are inserted into mounting holes 134 of the lower cover 130 so that one side of the ring terminal 140 is connected with each bus bar terminal 120 protruding from the main body 110, and an opposite side of the ring terminal 140 may be fixed inside the lower cover 130 through laser welding.

In the present exemplary embodiment, the ring terminal 140 is fixed through laser welding by way of example, but the present invention is not limited thereto. That is, various welding methods including laser welding are applicable.

If mounting of the ring terminal 140 is terminated, a worker couples the upper cover 150 with an upper portion of the lower cover 130 to assemble the lower cover 130 with the upper cover 150 (S4 of FIG. 6).

In this case, the upper cover 150 may be integrally formed therein with at least one locking hook 152 corresponding to each locking groove 136 to be coupled and fixed in at least one locking groove 136 formed in the lower cover 130.

That is, in the present exemplary embodiment, each locking groove 136, as illustrated in S40 of FIG. 7, is formed at both outer peripheral surfaces of one end and a rear end of the lower cover 130, and locking hooks 152 are formed at both bottom sides of one end and a rear end of the upper cover 150 corresponding to each locking groove 136, respectively.

Each locking hook 152 is fixed to be inserted into each locking groove 136, and maintains a coupled state between the upper cover 150 and the lower cover 130 to prevent the upper cover 150 from being separated from the lower cover 130.

Next, the worker mounts a sealing member 160 in the main body 110 between the main body 110 and the lower cover 130 and the upper cover 150 which are coupled with each other (S5 of FIG. 6).

In this case, since the sealing member 160 has a ring shape and is made of a silicon material, as illustrating in S50 of FIG. 7, in a state in which the lower cover 130 and the upper cover 150 are assembled with each other in the main body 110, the sealing member 160 is inserted toward the main body 110 to increase the inside diameter from a rear end of the coupled lower and upper covers 130 and 150.

As shown in S60 of FIG. 7, if the sealing member 160 is mounted in a correct position in the main body 110, an inside diameter is reduced in an initial state by elastic restoring force so that the sealing member 160 is firmly fixed in the main body 110.

That is, the power connector 100 for a thermostat according to an exemplary embodiment of the present invention is manufactured by sequentially performing steps S1 to S4 as described above.

Therefore, if the connector 100 for a thermostat and the manufacturing method thereof according to an exemplary embodiment of the present invention configured as above are applied, a bus bar terminal is integrally provided inside the connector 100 for a thermostat, assembling and manufacturing are easy by applying an assembling type of structure assembled to separate the lower cover 130 from the upper cover 150, and the productivity may be improved by reducing a manufacturing time.

Further, when the connector 100 for a thermostat is connected with the cartridge heater 10, the connection reliability with the lead wire 12 may be ensured to stably supply power to the cartridge heater 10 by preventing separation of the lead wire 12 while inserting the lead wire 12. Accordingly, responsiveness of the cartridge heater 10 may be improved, and the overall merchantability of the thermostat may be improved.

A power connector 200 for a thermostat according to another exemplary embodiment of the present invention will now be described in detail with reference to FIG. 8 and FIG. 9.

In the following description of the power connector 200 for a thermostat according to another exemplary embodiment of the present invention, a cartridge heater 10 and a lead wire 12 being the same as those of the above embodiment are described by making reference to the description of the above embodiment.

Figure 8:
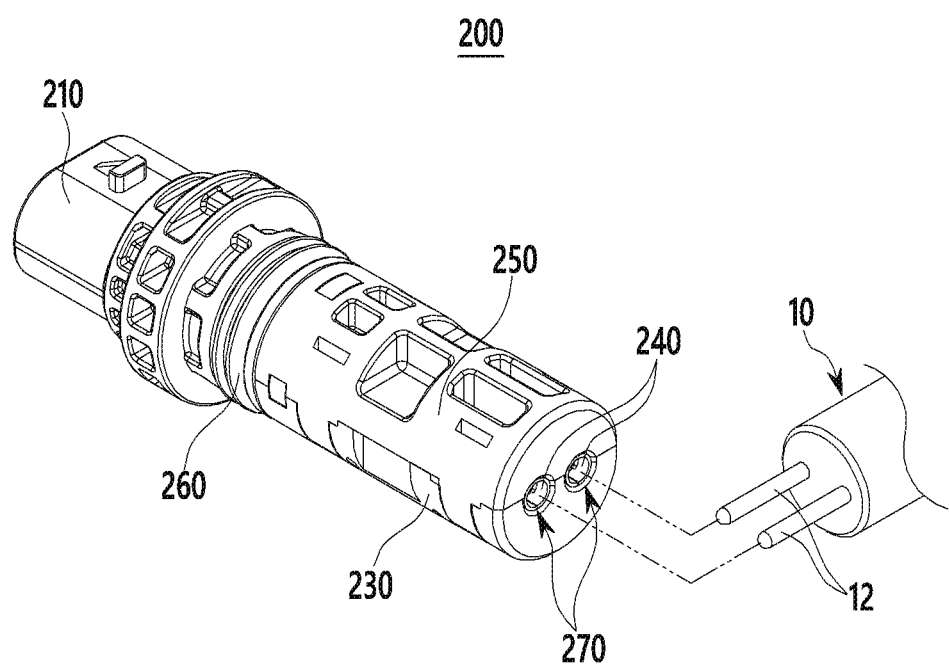
FIG. 8 is a perspective view illustrating a power connector for a thermostat according to another exemplary embodiment of the present invention.
Figure 9:
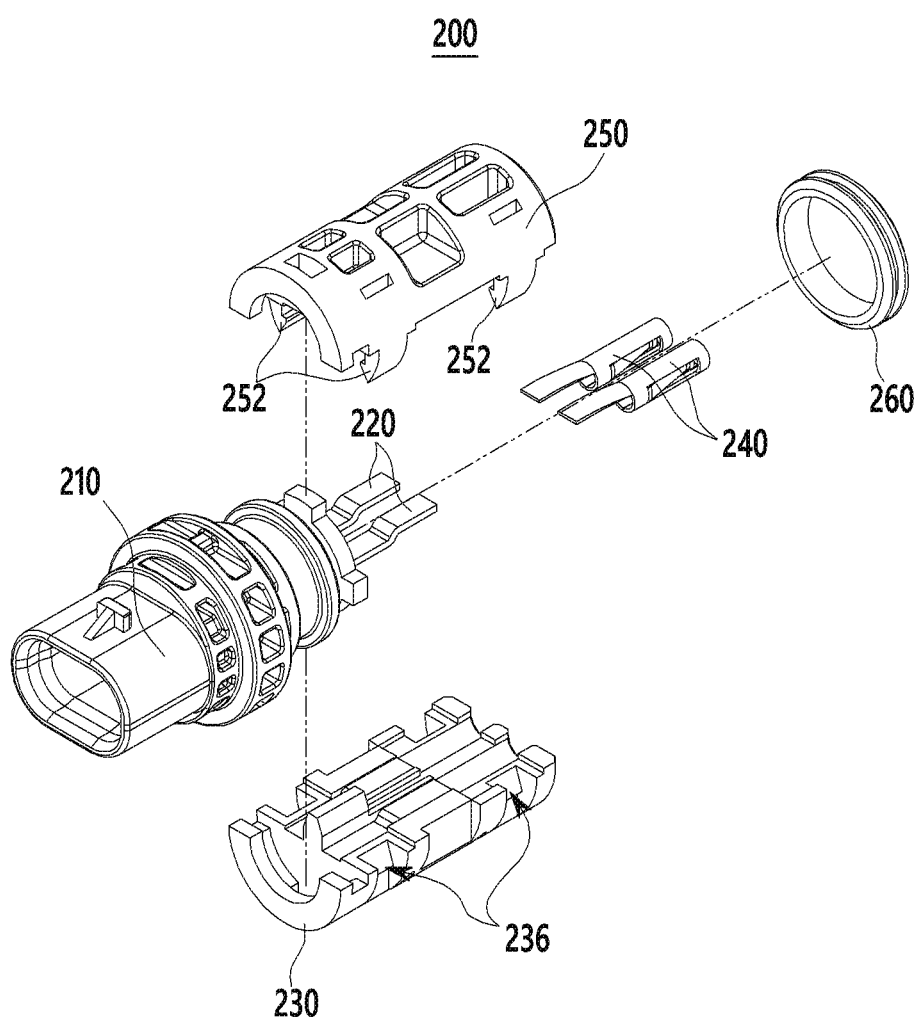
FIG. 9 is an exploded perspective view illustrating a power connector for a thermostat according to another exemplary embodiment of the present invention.

FIG. 8 is a perspective view illustrating a power connector for a thermostat according to another exemplary embodiment of the present invention, and FIG. 9 is an exploded perspective view illustrating a power connector for a thermostat according to the other exemplary embodiment of the present invention.

Referring to the drawings, the power connector 200 for a thermostat according to the other exemplary embodiment of the present invention is connected with a cartridge heater 10 in an electronic thermostat and is integrally provided therein with a bus bar terminal 220 to easily supply power, is easily manufactured by applying an assembling type of structure, and is capable of improving responsiveness of a cartridge heater by stably supplying power because the connection reliability with the cartridge heater 10 may be ensured.

To this end, in the power connector 200 for a thermostat according to an exemplary embodiment of the present invention, as shown in FIG. 8 and FIG. 9, a lead wire 12 provided in the cartridge heater 10 is connected with the power connector 200 so that the power connector 200 supplies power to the cartridge heater 10. The power connector 200 for a thermostat includes a main body 210, a bus bar terminal 220, a lower cover 230, a ring terminal 240, an upper cover 250, and a coupling hole 270.

First, an external power terminal is connected with an end of the main body 210.

Two bus bar terminals 220 are provided. Opposite ends of the bus bar terminals 220 partially protrude from another end of the main body while ends of the bus bar terminals 220 are inserted into an end of the main body 210 in which an external power terminal (not shown) is inserted.

When the main body 210 is molded by injection molding, the bus bar terminal 220 may be integrally provided inside the main body 110 through insert injection molding. When power is connected, the bus bar terminals 220 may be connected as a positive (+) pole and a negative (−) pole, respectively.

In the present exemplary embodiment, one end of the lower cover 230 is connected with an opposite end of the main body 210 at a lower portion of the main body 210.

The ring terminal 240 is mounted at an inner side of an opposite end of the lower cover 230 to be connected with each bus bar terminal 220.

In this case, the ring terminal 240 may be made of a conductive metallic material, and may be fixed at an inner side of the lower cover 230 through laser welding.

Meanwhile, in another exemplary embodiment of the present invention, the ring terminal 240 is fixed through laser welding by way of example, but the present invention is not limited thereto. That is, various welding methods including laser welding are applicable.

In another exemplary embodiment of the present invention, one end of the upper cover 250 is connected with an opposite end of a main body 210 at a lower portion of the lower cover 230 to be coupled with the lower cover 230.

Further, the coupling hole 270 is connected at opposite ends of the lower cover 230 and the upper cover 250 which are coupled with each other by inserting the lead wire 12 of the cartridge heater 10 into the ring terminal 240.

In this case, the coupling hole 270 may be formed in a horizontal direction with respect to the main body 220.

That is, a mounting direction of the power connector 200 mounted inside a thermostat housing is changed according to a mounted position of the thermostat inside an engine compartment. When the power connector 200 is vertically mounted inside the thermostat housing, the coupling hole 270 is formed horizontal with respect to the main body 210, so that the power connector 200 is easily connected with the lead wire 12 of the cartridge heater 10 which is longitudinally mounted inside the thermostat.

Further, the ring terminal 240 has a cylindrical shape so that the lead wire 12 may be inserted into the ring terminal 240. A width of the ring terminal 240 is gradually reduced in the direction of a rear end of the ring terminal 240 toward an opposite end of the lower cover 230 and the upper cover 250 from one end thereof toward the main body inside the lower cover 230 and the upper cover 250 which are coupled with each other.

Accordingly, the ring terminal 240 firmly fixes the lead wire 12 inserted in each coupling hole 270 to prevent the inserted lead wire 12 from being separated from the ring terminal 240, and stably connects the bus bar terminal 220 with the lead wire 12.

Meanwhile, in another exemplary embodiment of the present invention, at least one locking hook 252 may be formed at one side of the upper cover 250 corresponding to the lower cover 230, and at least one locking groove 236 may be formed at an outer peripheral surface of the lower cover 230 corresponding to each locking hook 252.

That is, each locking hook 252 protrudes downward of both sides of one end and an opposite end of the upper cover 250, and each locking groove 236 may be formed at both outer peripheral surfaces of the one end and the opposite end of the lower cover 230.

Accordingly, when the upper cover 250 is assembled with the lower cover 230, the locking hook 252 protruding downward of both sides of the one end and the opposite end of the upper cover 250 is caught and fixed while being inserted into each locking groove 236 to maintain a mutually assembled state.

The lower cover 230 and the upper cover 250 include a section having a semicircular shape to be coupled with each other, which leads to formation of a cylindrical shape.

That is, the lower cover 230 and the upper cover 250 configured as above are manufactured, assembled, and coupled with each other through injection molding so that the bus bar terminal 220 may be conveniently mounted in the insert injection molded main body 210, and the ring terminal 240 connected with each bus bar terminal 220 may be easily mounted.

Meanwhile, in another exemplary embodiment of the present invention, an opposite end of the main body 210 may be mounted therein with a sealing member 260 between the lower cover 230 and the upper cover 250 where one end of the lower cover 230 is assembled with one end of the upper cover 250.

The sealing member 260 has a ring shape, and may be made of a silicon material.

Accordingly, the sealing member 260 is inserted toward the main body 210 from rear ends of the lower cover 230 and the upper cover 250 coupled with each other in a state in which the lower cover 230 and the upper cover 250 are assembled and mounted in the main body 210. In this case, the sealing member 260 is inserted to increase an inside diameter of the sealing member 260 so that the lower cover 230 and the upper cover 250 may be easily mounted.

If the sealing member 260 is mounted in a correct position in the main body 210, an inside diameter is reduced in an initial state by elastic restoring force so that the sealing member 260 is firmly fixed in the main body 210.

The sealing member 260 is mounted in the main body 210 between the main body 210 and the lower and upper covers 230 and 250 to prevent cooling water introduced into a thermostat housing (not shown) through the power connector 200 mounted inside the thermostat housing from leaking so that a space between an outer peripheral surface of the connector 200 and the thermostat housing is sealed to prevent the cool water from leaking.

Meanwhile, in another exemplary embodiment, the sealing member 260 is formed of a silicon material by way of example, but the present invention is not limited thereto. That is, the sealing member 260 may be formed of a rubber material.

Therefore, if the connectors 100 and 200 for a thermostat and the manufacturing method thereof according to exemplary embodiments of the present invention configured as above are applied, bus bar terminals 120 and 220 are integrally provided inside the connectors 100 and 200 for a thermostat, assembling and manufacturing are easy by applying an assembling type of structure assembled to separate the lower covers 130 and 230 from the upper covers 150 and 250, and the productivity may be improved by reducing a manufacturing time.

In addition, when the connector for a thermostat is connected with the cartridge heater 10, connection reliability with the lead wire 12 may be ensured to stably supply power to the cartridge heater 10 by preventing separation of the lead wire 12 while inserting the lead wire 12. Accordingly, responsiveness of the cartridge heater 10 may be improved, and the overall merchantability of the thermostat may be improved.

Moreover, the connector for a thermostat may be vertically or horizontally connected with the cartridge heater 10 to easily connect external power according to a mounting position and a housing shape of the thermostat so that the mountability and connectivity can be improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A power connector for a thermostat connected with a lead wire included in a cartridge heater to supply power to the cartridge heater, the power connector for a thermostat comprising:
   a main body including an end connected with an external power terminal;
   two bus bar terminals including opposite ends partially protruding from an opposite end of the main body while ends of the bus bar terminals are inserted into the main body;
   a lower cover including one end connected with the main body at a lower portion of the main body, and formed therein with insertion holes in which lead wires of the cartridge heater are inserted;

two ring terminals mounted inside the lower cover corresponding to the respective insertion holes to be connected with a respective bus bar terminal, wherein the lead wire inserted into the insertion hole is inserted and fixed into the ring terminal; and an upper cover coupled with the lower cover at a lower portion of the lower cover, wherein one end of the upper cover is connected with one end of the main body.

2. The power connector for a thermostat of claim 1, wherein the bus bar terminals are integrally provided inside the main body through insert injection molding when the main body is molded.

3. The power connector for a thermostat of claim 1, wherein at least one locking hook is formed at one side of the upper cover corresponding to the lower cover.

4. The power connector for a thermostat of claim 3, wherein the locking hooks are formed at both sides of one end and a rear end of the upper cover, respectively.

5. The power connector for a thermostat of claim 3, wherein at least one locking groove is formed at an outer peripheral surface of the lower cover corresponding to the locking hook.

6. The power connector for a thermostat of claim 5, wherein the locking grooves are formed at both outer peripheral sides of one end and a rear end of the lower cover, respectively.

7. The power connector for a thermostat of claim 1, wherein the lower cover and the upper cover include a section having a semicircular shape to be coupled with each other, which leads to formation of a cylindrical shape.

8. The power connector for a thermostat of claim 1, wherein each ring terminal is mounted through a respective mounting hole connected with the respective insertion hole inside the lower cover, and is fixed through laser welding while being mounted in the mounting hole.

9. The power connector for a thermostat of claim 1, wherein each insertion hole is formed perpendicular to the main body at the opposite end of the lower cover.

10. The power connector for a thermostat of claim 1, wherein the bus bar terminals are connected as a positive (+) pole and a negative (−) pole, respectively, when power is connected.

11. The power connector for a thermostat of claim 1, wherein an opposite end of the main body is mounted therein with a sealing member between the lower cover and the upper cover where one end of the lower cover is assembled with one end of the upper cover.

12. The power connector for a thermostat of claim 11, wherein the sealing member has a ring shape, and is made of a silicon material.

13. A power connector for a thermostat connected with a lead wire included in a cartridge heater to supply power to the cartridge heater, the power connector for a thermostat comprising:

a main body including an end connected with an external power terminal;

two bus bar terminals including opposite ends partially protruding from an opposite end of the main body while ends of the bus bar terminals are inserted into the main body;

a lower cover including one end connected with the main body at a lower portion of the main body;

two ring terminals mounted at an inner side of an opposite end of the lower cover to be connected with a respective bus bar terminal;

an upper cover including one end connected with an opposite end of the main body at a lower portion of the lower cover to be coupled with the lower cover; and a coupling hole connected at opposite ends of the lower cover and the upper cover which are coupled with each other by inserting a lead wire of the cartridge heater into the respective ring terminal.

14. The power connector for a thermostat of claim 13, wherein the coupling hole is formed horizontally with respect to the main body.

15. The power connector for a thermostat of claim 13, wherein the bus bar terminals are integrally provided inside the main body through insert injection molding when the main body is molded.

16. The power connector for a thermostat of claim 13, wherein at least one locking hook is formed at one side of the upper cover corresponding to the lower cover.

17. The power connector for a thermostat of claim 16, wherein the locking hooks are formed at both sides of one end and a rear end of the upper cover, respectively.

18. The power connector for a thermostat of claim 16, wherein at least one locking groove is formed at an outer peripheral surface of the lower cover corresponding to the locking hook.

19. The power connector for a thermostat of claim 18, wherein the locking grooves are formed at both outer peripheral sides of one end and a rear end of the lower cover, respectively.

20. The power connector for a thermostat of claim 13, wherein the lower cover and the upper cover include a section having a semicircular shape to be coupled with each other, which leads to formation of a cylindrical shape.

21. The power connector for a thermostat of claim 13, wherein an opposite side of each ring terminal is fixed through laser welding in a state in which one side of each ring terminal is connected with the respective bus bar terminal inside the lower cover.

22. The power connector for a thermostat of claim 13, wherein the bus bar terminals are connected as a positive (+) pole and a negative (−) pole, respectively, when power is connected.

23. The power connector for a thermostat of claim 13, wherein an opposite end of the main body is mounted therein with a sealing member between the lower cover and the upper cover where one end of the lower cover is assembled with one end of the upper cover.

24. The power connector for a thermostat of claim 23, wherein the sealing member has a ring shape, and is made of a silicon material.

25. The power connector for a thermostat of claim 1, wherein an opposite side of each ring terminal is fixed through laser welding in a state in which one side of each ring terminal is connected with the respective bus bar terminal inside the lower cover.

26. The power connector for a thermostat of claim 11, wherein the sealing member has a ring shape, and is made of a rubber material.

27. A method of manufacturing a power connector for a thermostat connected with a lead wire included in a cartridge heater to supply power to the cartridge heater, the method comprising:

injection molding a main body and lower and upper covers;

assembling the lower cover in the main body;

mounting two ring terminals in the lower cover;
assembling the upper cover with an upper portion of the lower cover on which the ring terminal is mounted; and
mounting a sealing member between the main body and the lower cover and the upper cover which are coupled with each other.

28. The method of claim 27, wherein the main body is molded through injection molding in a state in which the main body is provided therein with two bus bar terminals.

29. The method of claim 28, wherein the bus bar terminals partially protrude toward the lower cover and the upper cover mounted in the main body.

30. The method of claim 28, wherein one side of each ring terminal is connected with the respective bus bar terminal protruding from the main body inside the lower cover, and an opposite side of each ring terminal is fixed inside the lower cover through laser welding.

31. The method of claim 27, wherein the upper cover is integrally formed therein with at least one locking hook corresponding to at least one locking groove to be coupled and fixed in the locking groove which is formed in the lower cover.

32. The method of claim 27, wherein the sealing member has a ring shape, and is made of a silicon material.

* * * * *